US012662038B2

(12) United States Patent
Hansel et al.

(10) Patent No.: US 12,662,038 B2
(45) Date of Patent: Jun. 23, 2026

(54) SOLAR TABLE MOBILE TRANSPORT WITH SIDESHIFT

(71) Applicant: Terabase Energy, Inc., Berkeley, CA (US)

(72) Inventors: Adam Hansel, Davis, CA (US); Tyler Grushkowitz, Corvallis, OR (US); Brian Coleman, Portland, OR (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 318 days.

(21) Appl. No.: 18/214,245

(22) Filed: Jun. 26, 2023

(65) Prior Publication Data

US 2024/0424969 A1 Dec. 26, 2024

(51) Int. Cl.
B60P 3/00 (2006.01)
B25J 5/00 (2006.01)
B60P 1/00 (2006.01)

(52) U.S. Cl.
CPC ................. B60P 1/00 (2013.01); B25J 5/007 (2013.01); B60P 3/00 (2013.01)

(58) Field of Classification Search
CPC .......... B25J 5/007; B25J 9/162; B25J 9/1682; B60P 3/00
See application file for complete search history.

(56) References Cited

U.S. PATENT DOCUMENTS

| | | | |
|---|---|---|---|
| 4,042,004 A | 8/1977 | Kwan | |
| 7,012,188 B2 | 3/2006 | Erling | |
| 7,105,940 B2 | 9/2006 | Weesner et al. | |
| 8,584,338 B2 | 11/2013 | Potter | |
| 8,650,812 B2 | 2/2014 | Cusson | |
| 9,827,678 B1 | 11/2017 | Gilbertson et al. | |
| 10,232,505 B2 | 3/2019 | Tadayon | |
| 10,414,318 B2 | 9/2019 | Valtanen | |
| 10,696,451 B2 | 6/2020 | Britcher et al. | |
| 10,801,755 B1 | 10/2020 | Nemat et al. | |
| 11,228,275 B2 | 1/2022 | Miller et al. | |
| 11,241,799 B2 | 2/2022 | Clemenzi et al. | |

(Continued)

FOREIGN PATENT DOCUMENTS

| | | |
|---|---|---|
| CN | 103324204 B | 11/2012 |
| CN | 104102227 B | 7/2017 |

(Continued)

OTHER PUBLICATIONS

International search report and written opinion of the international searching authority mailed Nov. 20, 2023 in related PCT application No. PCT/US2023/029584, (7 pgs).

(Continued)

*Primary Examiner* — Kaitlin S Joerger

(74) *Attorney, Agent, or Firm* — Michael North

(57) ABSTRACT

A solar table mobile transport with sideshift capability is described that moves a solar table to a point of installation. The solar table mobile transport comprises multiple motors that allow movement within a three-dimensional coordinate system as well as provide angular controls of pitch, yaw and roll. Extended horizontal movement of the solar table is provided by a sideshift element that extends the solar table beyond an edge of a transport component of the solar table mobile transport.

11 Claims, 8 Drawing Sheets

(56) References Cited

U.S. PATENT DOCUMENTS

| | | | |
|---|---|---|---|
| 11,245,353 B2 | 2/2022 | Di Stefano et al. | |
| 11,502,638 B2 | 11/2022 | Watson et al. | |
| 11,770,099 B2 | 9/2023 | Carter | |
| 11,999,284 B2 | 6/2024 | Campbell et al. | |
| 2006/0201987 A1 | 9/2006 | Brown | |
| 2008/0260500 A1 | 10/2008 | Meulen | |
| 2010/0000592 A1 | 1/2010 | Ko | |
| 2010/0279455 A1 | 11/2010 | Seemann | |
| 2011/0284709 A1 | 11/2011 | Potter | |
| 2012/0027550 A1 | 2/2012 | Bellacicco et al. | |
| 2012/0085387 A1* | 4/2012 | French, Sr. | H10F 77/63 |
| | | | 136/246 |
| 2012/0085395 A1 | 4/2012 | Kuster et al. | |
| 2012/0279069 A1 | 11/2012 | Von Deylen | |
| 2013/0133172 A1 | 5/2013 | Kiener et al. | |
| 2013/0153007 A1 | 6/2013 | Plesniak | |
| 2013/0340807 A1 | 12/2013 | Gerwing et al. | |
| 2014/0025343 A1 | 1/2014 | Gregg et al. | |
| 2014/0143061 A1 | 5/2014 | Abyanker | |
| 2014/0246549 A1 | 9/2014 | West et al. | |
| 2015/0059827 A1 | 3/2015 | Reed et al. | |
| 2015/0066442 A1 | 3/2015 | Pryor | |
| 2015/0069001 A1 | 3/2015 | French et al. | |
| 2015/0075880 A1 | 3/2015 | Grossen et al. | |
| 2015/0210519 A1 | 7/2015 | Koyama | |
| 2016/0014283 A1 | 1/2016 | Nakano et al. | |
| 2016/0129595 A1 | 5/2016 | Gerio et al. | |
| 2016/0140283 A1 | 5/2016 | Morse et al. | |
| 2016/0285412 A1 | 9/2016 | French | |
| 2017/0137238 A1 | 5/2017 | Kamata | |
| 2019/0280641 A1 | 9/2019 | Owen | |
| 2019/0280647 A1* | 9/2019 | Novotny | B08B 5/02 |
| 2019/0341878 A1 | 11/2019 | Watson et al. | |
| 2019/0367014 A1 | 12/2019 | Woodley | |
| 2020/0076358 A1 | 3/2020 | Au | |
| 2020/0350850 A1 | 11/2020 | Di Stefano et al. | |
| 2021/0041145 A1 | 2/2021 | Dally | |
| 2021/0205997 A1 | 7/2021 | Zhou et al. | |
| 2021/0206003 A1 | 7/2021 | Zhou et al. | |
| 2021/0234504 A1 | 7/2021 | Meller et al. | |
| 2021/0293455 A1 | 9/2021 | Au | |
| 2021/0379757 A1 | 12/2021 | Schneider et al. | |
| 2022/0034426 A1 | 2/2022 | Clapper et al. | |
| 2022/0103122 A1 | 3/2022 | Carter | |
| 2022/0234516 A1 | 7/2022 | Prentice et al. | |
| 2022/0411245 A1 | 12/2022 | Bailey | |
| 2023/0066547 A1 | 3/2023 | Campbell et al. | |
| 2023/0163720 A1 | 5/2023 | Di Stefano et al. | |
| 2024/0001836 A1 | 1/2024 | Di Stefano et al. | |
| 2024/0128920 A1* | 4/2024 | de Fresart | H02S 20/23 |
| 2024/0140292 A1* | 5/2024 | Schuknecht | B60P 3/002 |
| 2024/0258968 A1* | 8/2024 | Morin | H02S 50/00 |
| 2024/0270146 A1* | 8/2024 | Campbell | H02S 10/00 |
| 2024/0278704 A1 | 8/2024 | Campbell et al. | |
| 2024/0283388 A1* | 8/2024 | de Fresart | F16B 5/06 |
| 2025/0128930 A1 | 4/2025 | Hansel et al. | |
| 2025/0221084 A1* | 7/2025 | Daly | G06K 7/1413 |
| 2025/0226791 A1* | 7/2025 | Smith | H02S 30/00 |

FOREIGN PATENT DOCUMENTS

| | | | |
|---|---|---|---|
| CN | 209707983 U | 11/2019 | |
| CN | 219535977 U | 8/2023 | |
| DE | 102010038054 A1 | 3/2012 | |
| EP | 2263964 A2 | 12/2010 | |
| GB | 734098 | 7/1955 | |
| GB | 734098 A1 | 7/1955 | |
| KR | 101019430 B1 | 9/2008 | |
| KR | 20110031053 A | 9/2009 | |
| KR | 20210003486 A | 1/2021 | |
| WO | 2010145844 A2 | 12/2010 | |
| WO | 2011117485 A1 | 9/2011 | |
| WO | 2011128085 A2 | 10/2011 | |
| WO | 2013064624 A1 | 5/2013 | |
| WO | 2014060415 A1 | 4/2014 | |
| WO | 2014108196 A1 | 7/2014 | |
| WO | WO 2015190901 A1 | 12/2015 | |
| WO | WO 2018138033 A1 | 8/2018 | |
| WO | WO 2021119733 A1 | 6/2021 | |
| WO | 2021229387 A2 | 11/2021 | |
| WO | WO 2022112921 A1 | 6/2022 | |
| WO | WO 2023079377 A1 | 5/2023 | |

OTHER PUBLICATIONS

Response to Restriction requirement filed Nov. 21, 2023 in related U.S. Appl. No. 17/390,159, (7 pgs).
Non-final office action mailed Dec. 20, 2023 in related U.S. Appl. No. 17/464,178, (23 pgs).
International search report and written opinion of the international searching authority mailed Dec. 21, 2023 in related PCT application No. PCT/US2023/029583, (14 pgs).
Non-final office action mailed Jan. 18, 2024 in related U.S. Appl. No. 17/390,159, (33 pgs).
Notice of allowance mailed Nov. 14, 2023 in related U.S. Appl. No. 18/084,987, (21 pgs).
Extended European search report mailed Feb. 21, 2025 in related European patent application No. 22850167.2, (11 pgs).
Notice of Allowance mailed Mar. 12, 2025 in related U.S. Appl. No. 18/616,152, (13 pgs).
Non-Final office action mailed Mar. 18, 2025 in related U.S. Appl. No. 18/616,154, (13 pgs).
Response to Non-Final office action filed Apr. 27, 2025 in related U.S. Appl. No. 18/616,154, (10 pgs).
Extended European search report mailed Apr. 22, 2025 in related European patent application No. 22865583.3, (10 pgs).
Australian examination report No. 2 mailed Apr. 28, 2025 in related Australian patent application No. 2022318755, (5 pgs).
Response to Australian examination report filed Apr. 4, 2025 in related Australian patent application No. 2022340639, (34 pgs).
Non-Final office action mailed Apr. 25, 2025 in related U.S. Appl. No. 17/390,159, (39 pgs).
Final office action mailed Oct. 29, 2024 in related U.S. Appl. No. 17/581,873, (19 pgs).
Response to Advisory Action filed Jan. 29, 2025 in related U.S. Appl. No. 17/581,873, (17 pgs).
Non-Final office action mailed Nov. 15, 2024 in related U.S. Appl. No. 18/616,154, (17 pgs).
Response to Non-Final office action filed Dec. 1, 2024 in related U.S. Appl. No. 18/616,154, (7 pgs).
Notice of allowance mailed Dec. 20, 2024 in related U.S. Appl. No. 18/616,154, (5 pgs).
Non-Final office action mailed Nov. 18, 2024 in related U.S. Appl. No. 18/616,152, (13 pgs).
Response to Non-Final office action filed Nov. 27, 2024 in related U.S. Appl. No. 18/616,152, (7 pgs).
Notice of allowance mailed Dec. 26, 2024 in related U.S. Appl. No. 18/616,152, (8 pgs).
Response to final office action filed Nov. 16, 2024 in related U.S. Appl. No. 17/390,159, (14 pgs).
Advisory action mailed Dec. 27, 2024 in related U.S. Appl. No. 17/390,159, (6 pgs).
Response to advisory action filed Jan. 29, 2025 in related U.S. Appl. No. 17/390,159, (16 pgs).
Non-Final office action mailed Mar. 26, 2024 in related U.S. Appl. No. 17/581,873, (38 pgs).
Notice of Allowance mailed Mar. 7, 2024 in related U.S. Appl. No. 17/464,178, (12 pgs).
Non-Final office action response filed May 15, 2024 in related U.S. Appl. No. 17/390,159, (12 pgs).
Restriction requirement mailed Jul. 31, 2023 in related U.S. Appl. No. 18/084,987, (7 pgs).
Response to restriction requirement filed Sep. 28, 2023 in related U.S. Appl. No. 18/084,987, (8 pgs).
Restriction requirement mailed Sep. 22, 2023 in related U.S. Appl. No. 17/390,159, (7 pgs).

(56) References Cited

OTHER PUBLICATIONS

International search report and written opinion of the international searching authority mailed Dec. 16, 2022 in related PCT application No. PCT/US22/38288, (11 pgs).
International Search Report and Written Opinion of the International Searching Authority mailed Dec. 13, 2022 in related PCT application No. PCT/US22/42396, (9 pgs).
International Search Report and Written Opinion of the International Searching Authority mailed May 1, 2023 in related PCT application No. PCT/US23/11125, (9 pgs).
International Search Report and Written Opinion of the International Searching Authority mailed Sep. 14, 2024 in related PCT application No. PCT/US2024/35487, (11 pgs).
Australian examination report mailed Feb. 5, 2025 in related Australian patent application No. 2022318755, (5 pgs).
Non-final office action mailed Feb. 11, 2025 in related U.S. Appl. No. 17/581,873, (20 pgs).
Australian examination report mailed Feb. 11, 2025 in related Australian patent application No. 2022340639, (4 pgs).
Response to office action filed Jun. 26, 2024 in related U.S. Appl. No. 17/581,873, (10 pgs).
Final office action mailed Sep. 18, 2024 in related U.S. Appl. No. 17/390,159, (34 pgs).
Australian examination report mailed Jun. 3, 2025 in related Australian patent application No. 2023209790, (4 pgs).
Australian Notice of Allowance mailed Jun. 12, 2025 in related Australian patent application No. 2022340639, (4 pgs).
Non-final office action mailed Jun. 20, 2025 in related U.S. Appl. No. 18/616,152, (14 pgs).
Saudi Arabian examination report mailed Jun. 29, 2025 in related Saudi Arabian patent application No. SA 1120244048, (4 pgs).
Notice of Allowance mailed Jul. 8, 2025 in related U.S. Appl. No. 18/616,154, (8 pgs).
Non-final office action mailed Jul. 11, 2025 in related U.S. Appl. No. 17/979,911, (49 pgs).
Saudi Arabian examination report mailed Jul. 13, 2025 in related Saudi Arabian patent application No. SA 1120240965, (4 pgs).
Final office action mailed Aug. 5, 2025 in related U.S. Appl. No. 17/581,873, (28 pgs).
Australian office action response filed Aug. 11, 2025 in related Australian patent application No. 2022318755, (6 pgs).
Response to non-final office action filed Jul. 25, 2025 in related U.S. Appl. No. 17/390,159, (13 pgs).
Notice of grant mailed Oct. 9, 2025 in related Australian patent application No. 2022340639, (1 pg).
Notice of allowance mailed Nov. 3, 2025 in related U.S. Appl. No. 18/616,152, (9 pgs).
Non-final office action mailed Nov. 26, 2025 in related U.S. Appl. No. 18/370,862, (50 pgs).
Final office action mailed Oct. 2, 2025 in related U.S. Appl. No. 17/390,159, (32 pgs).
Final office action response filed Nov. 24, 2025 in related U.S. Appl. No. 17/390,159, (15 pgs).
Examination Report mailed Sep. 8, 2025 in related Australian patent application No. 2022318755, (5 pgs).
Response to examination report filed Nov. 17, 2025 in related Australian patent application No. 2022318755, (2 pgs).
Response to the Extended European Search Report (EESR) filed Sep. 22, 2025, in related European patent application No. 22865583.3, (13 pgs).
Final office action response filed Oct. 1, 2025 in related U.S. Appl. No. 17/581,873, (10 pgs).
Advisory action mailedOct. 20, 2025, in related U.S. Appl. No. 17/581,873, (3 pgs).

Advisory action response filedNov. 5, 2025, in related U.S. Appl. No. 17/581,873, (11 pgs).
Non-final office action mailed Nov. 14, 2025, in related U.S. Appl. No. 17/581,873, (18 pgs).
Non-final office action response filed Oct. 1, 2025, in related U.S. Appl. No. 17/979,911, (11 pgs).
Spanish Search report mailed Oct. 6, 2025, in related Spanish patent application No. 202590019, (9 pgs).
Response to examination report filed Oct. 24, 2025, in related Australian patent application No. 2023209790, (11pgs).
Response to Extended European Search Report filed Sep. 8, 2025, in related European patent application No. 22850167.2, (13 pgs).
Non-final office action response filed Feb. 26, 2026 in related U.S. Appl. No. 18/370,862, (9 pgs).
Examination Report No. 4 dated Dec. 11, 2025 in related Australian Patent Application 2022318755, (6 pgs).
Response to examination report No. 4 filed Jan. 13, 2026 in related Australian Patent Application 2022318755, (10 pgs).
Joseph H. Cain et al., "Wind Loads on Utility Scale Solar PV Power Plants", 2015 Seaoc Convention Proceedings, available from the Internet, <URL:chrome-extension://efaidnbmnnnibpcajpcglclefindmkaj/ https://cppwind.com/wp-content/uploads/2020/12/Wind-Loads-on-Utility-Scale-Solar-PV-Power-Plants_DBanks_2015.pdf> (8 pgs).
Examination Report No. 2 dated Dec. 11, 2025 in related Australian Patent Application 2023209790, (4 pgs).
Extended European Search Report dated Dec. 18, 2025 in related European Patent Application 23743710.8, (10 pgs).
Office action mailed Dec. 23, 2025 in related Brazilian Patent Application No. BR112024014367-8, (6 pgs).
Appeal brief filed Mar. 2, 2026 in related U.S. Appl. No. 17/390,159, (20 pgs).
Advisory Action mailed Dec. 29, 2025 in related U.S. Appl. No. 17/390,159, (4 pgs).
Response to Spanish search report filed Dec. 31, 2025 in related Spanish Patent Application No. P202590019, (74 pgs).
Final office action mailed Jan. 5, 2026 in related U.S. Appl. No. 17/979,911, (22 pgs).
Final office action response filed Jan. 25, 2026 in related U.S. Appl. No. 17/979,911, (9 pgs).
Examination Report No. 5 dated Feb. 3, 2026 in related Australian Patent Application 2022318755, (5 pgs).
Notice of allowance mailed Feb. 24, 2026 in related U.S. Appl. No. 17/979,911, (7 pgs).
Non-final office action response filed Feb. 9, 2026 in related U.S. Appl. No. 17/581,873, (11 pgs).
Final office action mailed Apr. 9, 2026 in related U.S. Appl. No. 18/370,862, (25 pgs).
Saudi Arabia examination report mailed Mar. 2, 2026 in related application No. SA 1120240368, (10 pgs).
Saudi Arabia examination report mailed Mar. 9, 2026 in related application No. SA 1120240965, (6 pgs).
Brazilian examination report mailed Mar. 31, 2026 in related application No. BR 112024003911-0, (6 pgs).
Spanish examination report mailed Apr. 1, 2026 in related application No. 202590019, (6 pgs).
Australian examination report mailed Apr. 9, 2026 in related application No. 2023372777, (4 pgs).
Response to Australian examination report filed Mar. 26, 2026 in related application No. 2023209790, (12 pgs).
Australian examination report No. 1 mailed Apr. 30, 2026 in related Australian patent application No. 2023412924, (4 pgs).
Notice of Allowance mailed May 19, 2026 in related Australian patent application No. 2023209790, (4 pgs).

* cited by examiner

SOLAR TABLE MOBILE TRANSPORT WITH SIDESHIFT

TECHNICAL FIELD

The present disclosure relates generally to a motorized solar table transport with horizontal sideshift capability that is used in the construction of large-scale solar systems. More particularly, the present disclosure relates to a motorized solar table transport with horizontal sideshift capability that moves a solar table from a solar table assembly factory to an installation point and provides extended horizontal, vertical and angular movement of a solar table for alignment to a specific installation site within the large-scale solar system.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move components around the site during the construction process.

Large-scale solar panel systems typically include thousands of solar panels that are located across a multi-acre terrain and that are electrically coupled to provide a source of energy. These large-scale systems are oftentimes located in remote areas and require a significant investment in materials, resources and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials being delivered to a deployment site via an access road. The materials are then processed and staged at the deployment site by a crew. A small portion of this delivered material is then moved by heavy equipment to a specific location where a solar panel and mounting equipment are assembled and installed at that location 102. The step is then repeated for an adjacent location 103 where materials are subsequently delivered, assembled and installed for a neighboring solar table within the system. While this approach may be effectively deployed in the installation of smaller solar systems, it becomes cost-prohibitive as the size of the system increases.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

FIGURE ("FIG.") 1 shows a prior art assembly and installation process of large-scale solar panel systems.

DETAILED DESCRIPTION OF EMBODIMENTS

Figure 1:
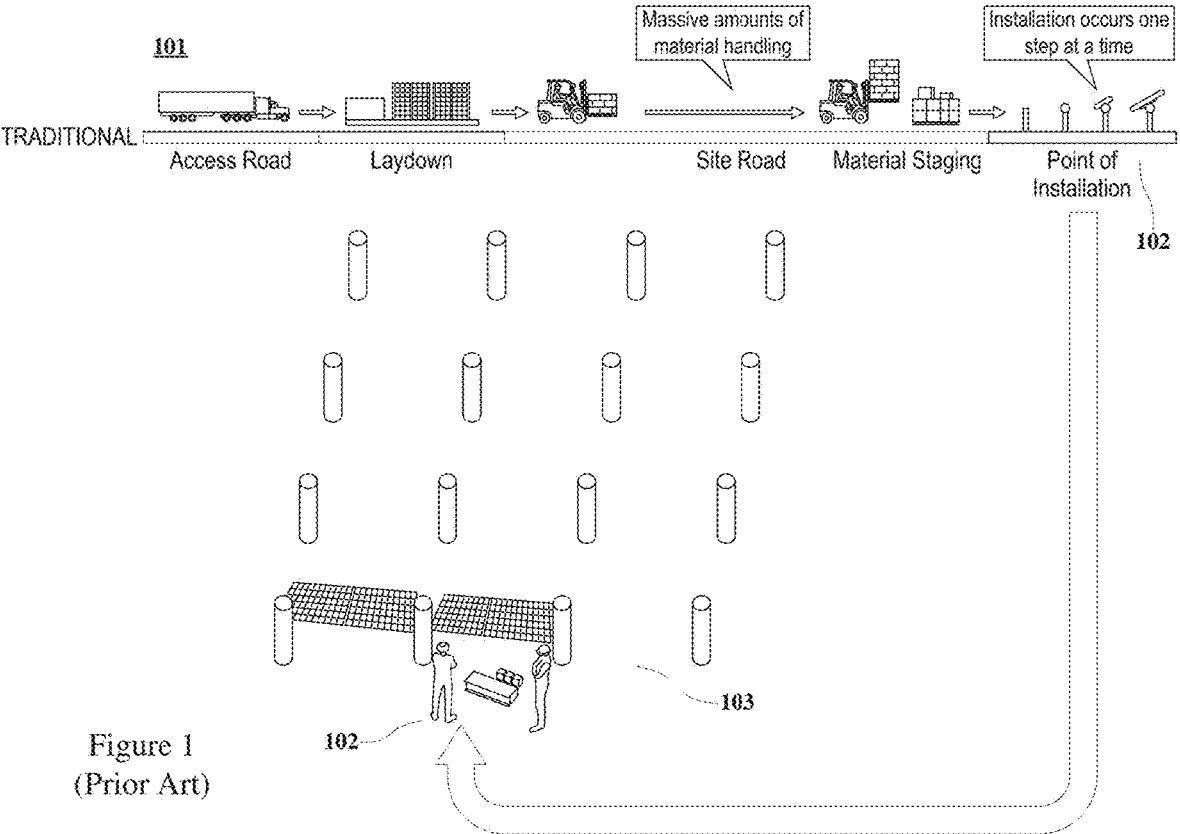

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the solar table mobile transport with sideshift capability.

Furthermore, connectivity between components or systems within the figures are not intended to be limited to direct connections. Also, components may be integrated together or be discrete prior to construction of a solar panel mobile transport with sideshift capability.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar table mobile transports; and (4) certain functions may be performed concurrently or in sequence.

Furthermore, it shall be noted that many embodiments described herein are given in the context of the assembly and installation of large numbers of solar tables within a system, but one skilled in the art shall recognize that the teachings of the present disclosure may apply to other large and complex construction sites in which resources and personnel are difficult to manage and accurately predict. Additionally, embodiments of a solar table mobile transport may be implemented in smaller construction sites.

In this document, "large-scale solar system" refers to a solar system having 1000 or more solar panels. The word "resources" refers to material, parts, components, equipment or any other items used to construct a solar table and/or solar system. The word "personnel" refers to any laborer, worker, designer or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) solar panels and/or electrical harnesses. The term "solar table mobile transport" (hereinafter, "mobile transport") describes a vehicle used to move a solar table to an installation site and facilitate an installation process of the solar table. A mobile transport may be driven by personnel, controlled by remote control or move autonomously within at least a portion of a solar system construction site. The term "transport component" refers to a lower portion of the mobile transport that provides movement and includes wheels (or similar features such as a tractor assembly or robotic system), steering mechanism (autonomous or personnel driven) and braking mechanism. The term "solar table alignment and support component" (hereinafter referred to as a "STAS component") is a structure that couples to the transport component and secures a solar table above the transport component. The STAS component provides alignment capability such that a torque tube and/or solar table may be moved in vertical, horizontal and angular motions. In certain embodiments, the STAS component comprises a sideshift structure that provides horizontal movement of the solar table beyond a plane defined by an outer edge of the transport component. In certain embodiments, the sideshift structure may also comprise a motor that provides horizontal movement of the solar table. The sideshift structure may be located anywhere within the STAS component including near the top or near the bottom of the STAS component. The term "motor" is defined as a structural device that produces motion of a solar table, this motion may be unidirectional or multidirectional.

Examples of some motors may include elements such as actuators, tracks, etc. that help in producing motion of structures within the mobile transport or the solar table.

Figure 2:
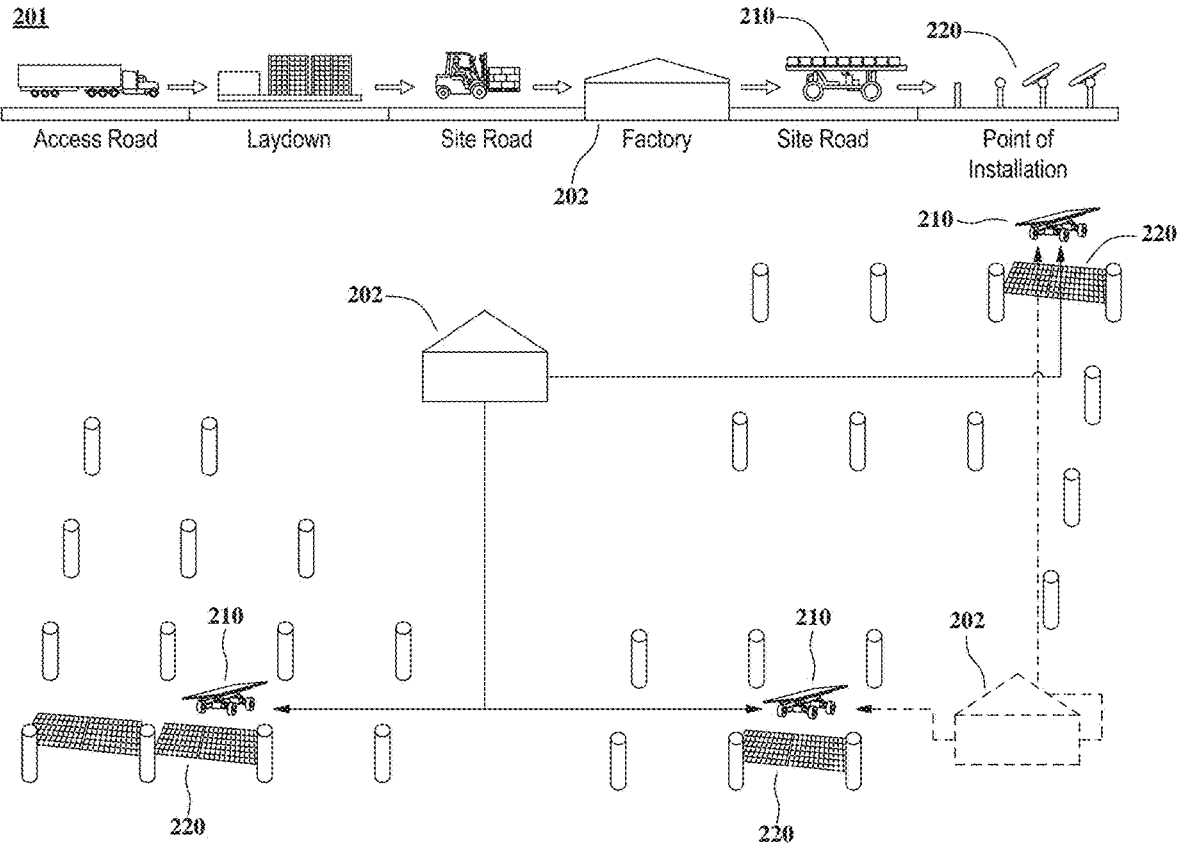
FIG. 2 is a diagram showing a centralized assembly and installation of a solar system including mobile transport of solar tables in accordance with various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates a more robust transport vehicle to move the pre-assembled components to the installation site. Additionally, the installation of these pre-assembled components may require functionality to support the alignment and integration of these components into the system. This alignment of a solar table secured on a mobile transport to a particular installation site is aided by horizontal motion facilitated by a sideshift structure and vertical motion via a STAS component.

Resources are brought to construction site 201 for a large-scale solar systems and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from factory 202 to an installation site 220 via motorized vehicles 210 such as a mobile transport with sideshift capability. In certain embodiments, the mobile transports are specifically designed to transport solar tables along a site road to the point of installation 220. As previously mentioned, the mobile transports 210 may be driven by personnel, may be controlled by remote control or autonomously driven by a computer system. The time and/or sequence in which solar tables are delivered to points of installation 220 may depend on a variety of factors that may be analyzed to configure a preferred schedule.

Delivery of an assembled solar table to an installation site requires an alignment process to securing points at the installation site. Because an assembled solar table is oftentimes large and heavy, this alignment process may be difficult and require significant effort by personnel to properly align both ends of a solar table to receptors, piles or other coupling elements at the installation site. Embodiments of the solar table mobile transport with sideshift capability allows motorized alignment of the solar table while it is still secured to the mobile transport. The sideshift capability also allows a less precise positioning of the mobile transport at the installation site due to the sideshift capability to provide extended horizontal movement of the solar table. As a result, the mobile transport is parked proximate to the installation site but does not require precise parking to initiate an alignment and installation process.

Figure 3:
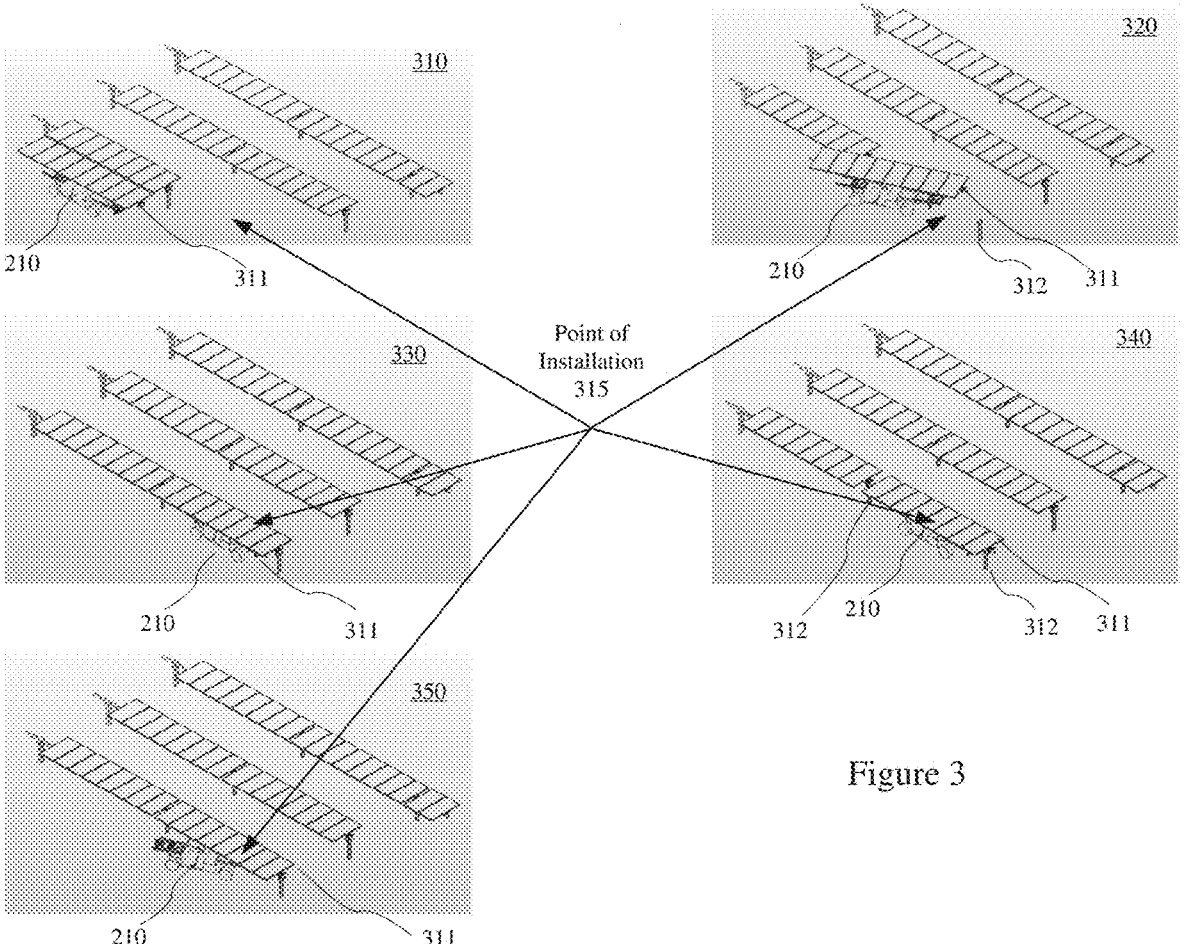
FIG. 3 is an exemplary sequence of diagrams illustrating an installation of a solar table within a solar system using a mobile transport according to various embodiments of the invention.

FIG. 3 illustrates a sequence of installation steps of a solar table at an installation site using a solar panel mobile transport with sideshift capability according to various embodiments of the invention. As shown in 310, a mobile transport 210 supporting a solar table 311 approaches a point of installation 315. The solar table 311 is secured to the mobile transport 210 by a solar table attachment component that securely holds the solar table above the mobile transport 210. In certain embodiments, the solar table 311 is assembled and secured to the attachment component at a centralized assembly factory and subsequently driven to the point of installation 315.

As shown in 320, the mobile transport 210 approaches the point of installation 315 in preparation for installation within the solar system. The point of installation 315 comprises structures used to secure the solar table 311 within the system. For example, a solar table 312 may be secured to a previously installed table whereby a torque tube in the solar table 311 is inserted into a previously installed table. The previously installed table may be secured to a pile 312 where threaded fasteners/rivets connect its bearing housing assembly/brackets to the pile 312. As shown in 330, the mobile transport 210 aligns the solar table 311 at the installation point 315 for subsequent integration into solar system. This alignment process will be discussed in more detail below and includes alignment along a three-dimensional coordinate system as well as angular control of yaw, pitch and roll. As previously stated, sideshift capability on the mobile transport 210 allows for this alignment when the mobile transport 210 is located proximate to the installation site and does not require precise parking of the mobile transport relative to the location site.

As shown in 340, the solar table is secured within the solar system after alignment is completed. This securitization process includes attached the solar table 210 to piles 312 that lock the solar table in line with adjacent solar tables. One skilled in the art will recognize that other processes may be employed to securely lock a solar table 311 within the system and may use other components that replace or supplement the piles 312.

As shown in 350, mobile transport 210 detaches from the solar table 311 after an alignment process has occurred using horizontal, vertical and angular control as needed. The STAS component lowers after the solar table 311 is secured within the system so that the mobile transport 210 may leave the point of installation 315.

Figure 4:
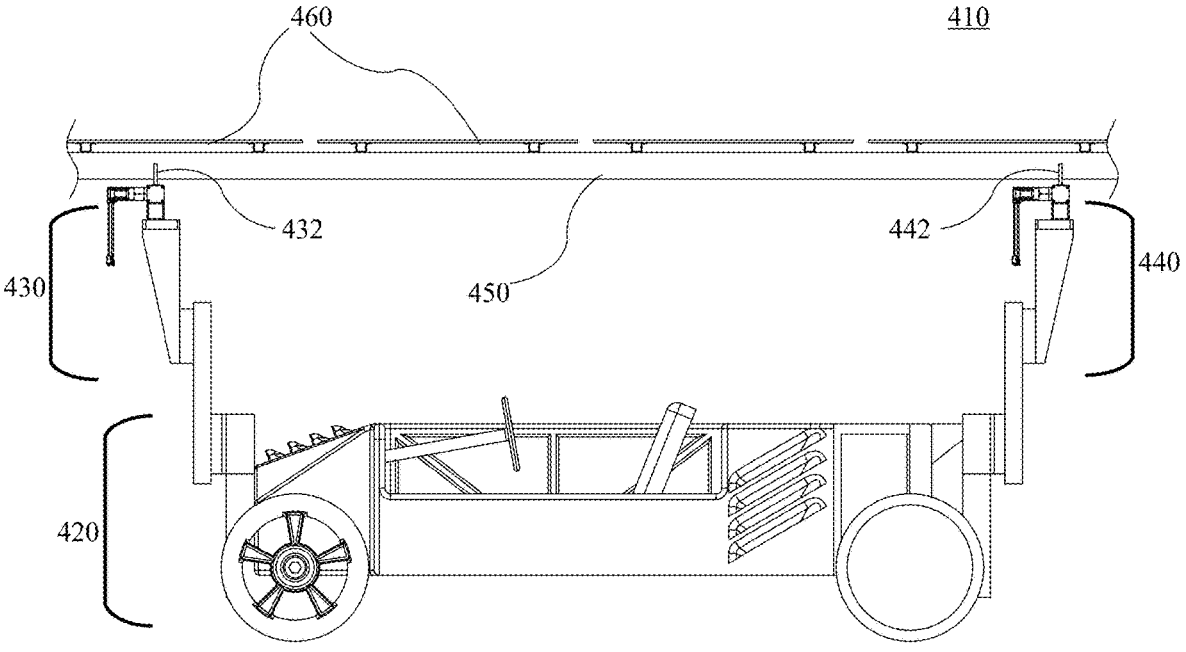
FIG. 4 is a side view of a solar table mobile transport with sideshift capability according to various embodiments of the invention.

FIG. 4 illustrates a side view of a mobile transport with sideshift capability in accordance with various embodiments of the invention. This mobile transport 410 comprises a first STAS component 430, a second STAS component 440 and a transport component 420 that support a robust vehicle that can securely move solar tables to an installation point and perform alignment and integration of the solar table into the solar system. In this example, the first STAS component 430 and the second STAS component 440 are coupled to a torque tube 450 and provide both vertical and horizontal movement of the solar table having multiple solar panels 460. In certain embodiments, the first and second STAS components 430, 440 comprise multiple motors that cause horizontal and vertical movement of the solar table. The horizontal and vertical movement caused by the first STAS component 430 and the horizontal and vertical movement caused by the second STAS component 440 operate at least partially independent of each other to enable angular control of the torque tube and/or solar table. This angular control (as well as the horizontal and vertical movements) allows a dynamic alignment process of the torque tube 450 within the installation site. According to various embodiments, the horizontal, vertical and angular motion of the torque tube 450 may be motorized or controlled by personnel by applying force to the torque tube 450 or other component(s) on the solar table.

The transport component 420 comprises a vehicular segment that can move throughout a solar system construction site under the control of a driving system. Examples of the vehicular segment include a wheel system, tractor system and/or robotic movement system that moves a solar table from a factory to an installation point. The transport component 420 comprises a driving system that effectively controls the movement of the mobile transport as it carries a solar table from a centralized, factory to an installation site. Examples of a driving system include systems that are controlled by an in-vehicle driver, a remote control being used by personnel or an autonomous driving system. If an autonomous driving system is employed, the transport component 420 comprises autonomous driving capabilities which include both a vehicle location element (such as a GPS location, autonomous sensor and image processing, and/or virtual construction site map including roads between factories and installation sites). One skilled in the art will recognize that the transport component 420 may be modified and/or supplemented with a variety of structural and functional elements to further assist in the transportation of solar tables within a solar system construction site.

The STAS components 430, 440 may be located above and coupled to the transport component 420. The STAS components 430, 440 may also be an extension to transport component 420 at a variety of angles and across one or more portions of the STAS components 430, 440. The STAS components 430, 440 comprise a plurality of attaching elements that securely attach to a solar table. In one example, the attaching elements are end effectors that securely hold a torque tube 450 to allow movement and alignment processes. As previously described, the STAS components 430, 440 also includes independent motors that position and align a solar table within a three-dimensional space as well as control angular movement to facilitate proper integration into a system. As will be described in more detail below, these motors can provide alignment of heavy structures, such as solar tables, with personnel controlling the motors or autonomous control where alignment movement is driven by sensors.

Solar table securing clamps, such as end effectors 432 and 442, may be positioned anywhere on the STAS components 430, 440 respectively to securely hold a variety of different shapes and types of solar tables. In one embodiment, the solar table securing clamps are positioned along an axis to allow secure attachment to a torque tube 450 of a solar table. This torque tube 450 may have other components, such as solar panels 460, attached to it.

One skilled in the art will recognize that the attachment component may be modified and/or supplemented with a variety of structural and function elements to further assist in the attachment process to a solar table or the alignment/installation process of the solar table within the solar system. These attachment components may couple to any structural part of the solar table in accordance with different embodiments of the invention.

Figure 5:
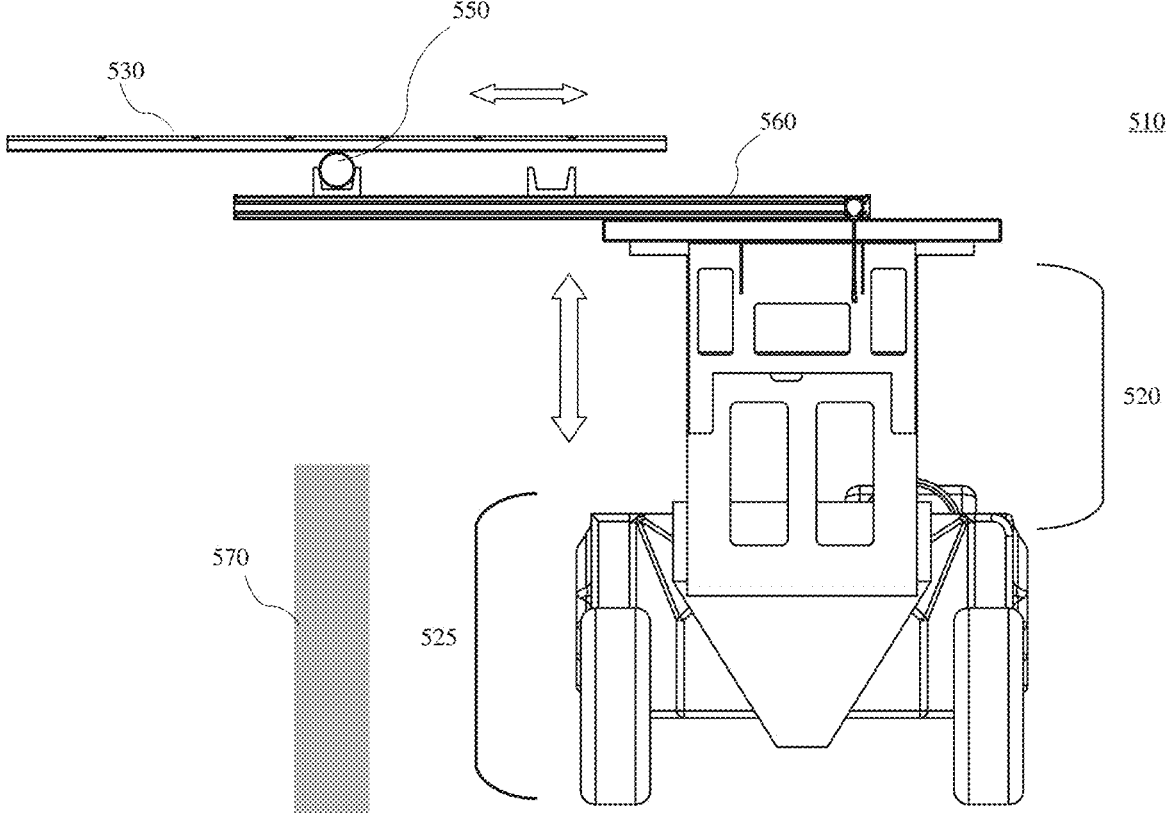
FIG. 5 is a front view of a first solar table mobile transport with sideshift capability in accordance with various embodiments of the present invention.

FIG. 5 illustrates a front view of a mobile transport with sideshift capability in accordance with various embodiments of the invention. The mobile transport 510 comprises a transport component 525 that provides movement to the mobile transport. The mobile transport 510 also comprises a first STAS component 520 and a second STAS component that is not shown and positioned behind the first STAS component 520. The first STAS component 520 comprises a sideshift element 560 that provides horizontal motion of a solar table 530. The sideshift element 560 is coupled to the solar table at the torque tube 550. In this particular example, the sideshift element 560 is shown as a rail having a motorized track that moves the solar table 530 along a horizontal plane. One skilled in the art will recognize that the sideshift element may be realized in a variety of different structures and may be motorized or manually controlled by personnel.

In this example, mobile transport 510 is parked proximate to a pile 570 to which the solar table 530/torque tube 550 is to be aligned and secured. In many instances, the torque tube 550 is secured at two or more securing elements (e.g., between two adjacent solar tables, between two piles, a combination thereof, or other types of securing elements). The sideshift capability of the mobile transport 510 allows it to be parked proximate to these securing elements instead of between the elements. In particular, the sideshift element 560 provides extended horizontal movement of the solar table 530 to facilitate alignment without the mobile transport 510 being positioned in between the securing elements.

As previously described, the first STAS component 520 (along with the second STAS component) facilitates horizontal, vertical and angular control such that the heavy solar table 530 is properly positioned relative to the securing elements to allow appropriate installation at the site.

Figure 6:
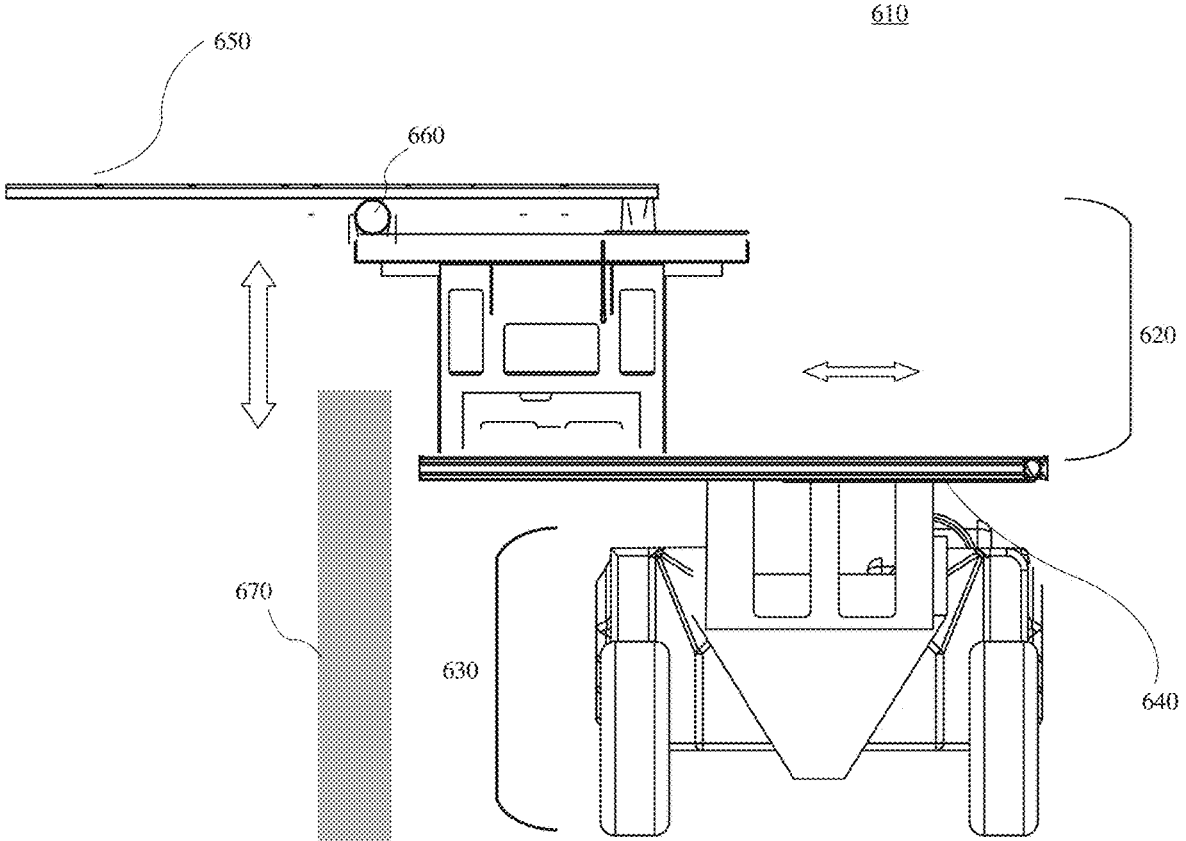
FIG. 6 is a front view of a second solar table mobile transport with sideshift capability in accordance with various embodiments of the present invention.

FIG. 6 is a front view of another example of a mobile transport with sideshift capability in accordance with various embodiments of the invention. In this particular example, the sideshift element is positioned near the bottom of the STAS components.

Referring to this figure, the mobile transport 610 comprises a transport component 630 and a first STAS component 620 (the second STAS component is not shown but positioned behind the first STAS component). The sideshift element 640 is positioned near the bottom of the first STAS component 620. A torque tube 660 on a solar table 650 is coupled to the first STAS 620 so that horizontal, vertical and angular motion may be performed during an alignment process. In this embodiment, the sideshift element 640 provides extended horizontal movement of the torque tube 660/solar table 650. As was the case in the first example, the extended horizontal movement provided by the sideshift element 640 allows for less precise positioning of the mobile transport 610 relative to the installation site. Accordingly, the mobile transport 610 should be parked sufficiently close to the pile 670 so that the extended horizontal movement allows horizontal alignment between the torque tube 660 and the pile 670.

In certain instances, as a solar table mounted on a sideshift element is extended horizontally beyond the edge of the transport component, the mobile transport may become unstable due to the downward force applied at the end of the sideshift element. In order to correct this instability, certain embodiments of the mobile transport may have compensation elements that counter this destabilizing force. Two examples of compensation elements are illustrated in FIGS. 7 and 8.

Figure 7:
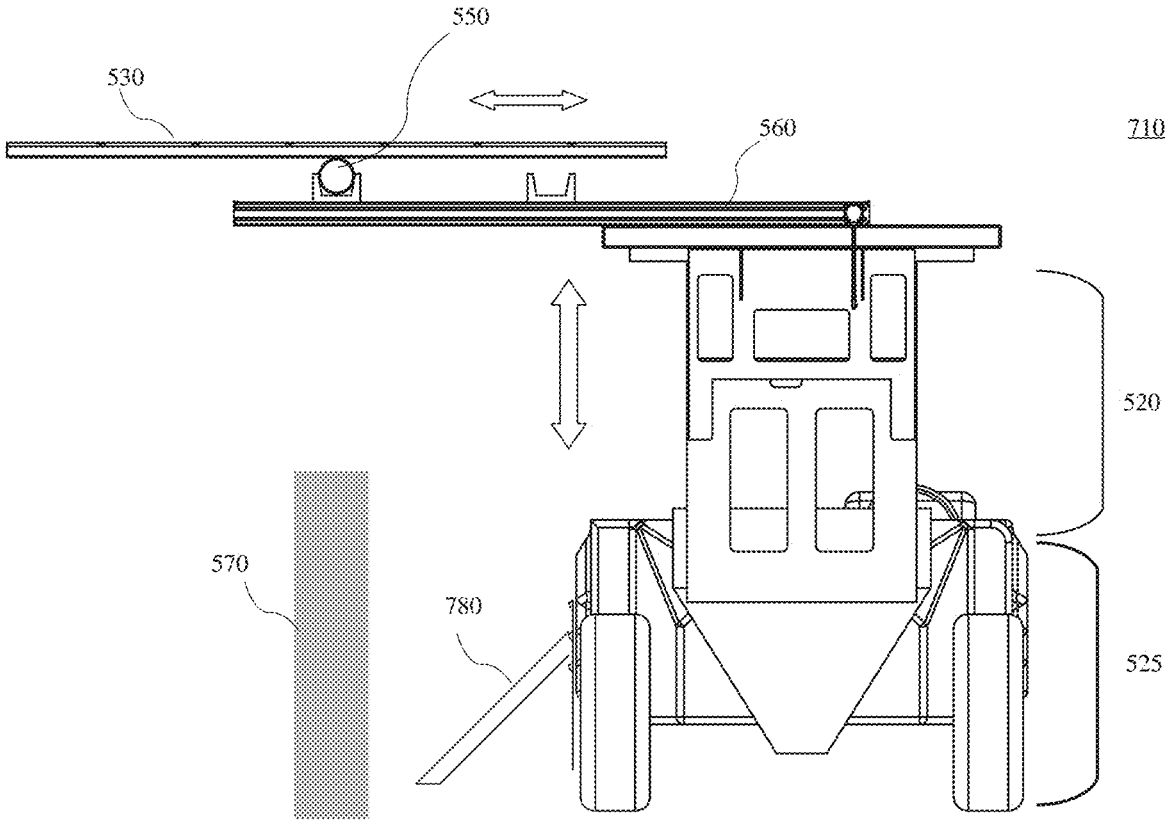
FIG. 7 is a front view of a solar table mobile transport with sideshift capability and at least one stabilizer according to various embodiments of the invention.

FIG. 7 illustrates a mobile transport 710 that comprises at least one stabilizer that prevents tipping or unwanted movement of the mobile transport when a solar table is extended horizontally according to various embodiments of the invention. In this example, a stabilizer leg 780 extends horizontally and downward from the same side of the mobile transport relative to the horizontally extended solar table such that one side of the leg is positioned on the ground and the other side of the leg is positioned on the mobile transport 710. This stabilizer leg 780 reduces tipping on the mobile transport 710 as the solar table 530 is extended.

One skilled in the art will recognize that the shape and size of the stabilizer leg 780 may vary based on a variety of factors including the weight, size and shape of the mobile transport 710, the weight, size and shape of the solar table 530, the terrain in which the mobile transport is operating, and the distance of which the solar table 530 is extended. Other factors may also relate to the shape and size of the stabilizer leg 780. Additionally, multiple stabilizer legs may be employed on the mobile transport 710.

Figure 8:
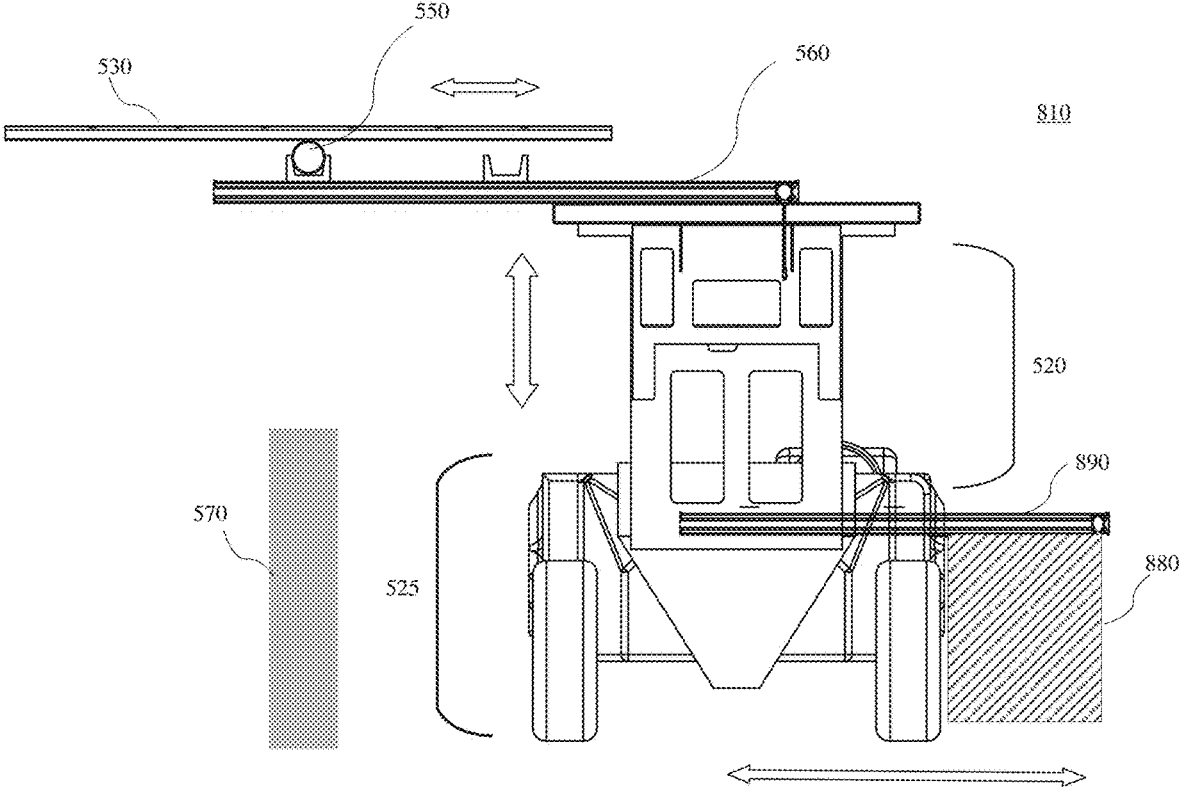
FIG. 8 is a front view of a solar table mobile transport with sideshift capability and at least one counterweight according to various embodiments of the invention.

FIG. 8 illustrates a mobile transport with sideshift capability that includes a counterweight in accordance with various embodiments of the invention. In this example, a moveable counterweight 880 is provided that moves along a rail 890 so that the mobile transport 810 may be stable during horizontal extension of the solar table 530. As shown, the counterweight 880 is positioned on the opposite side of the extended solar table 530 to reduce tipping or movement of the mobile transport 810.

One skilled in the art will recognize that the size, weight and shape of the counterweight 880 may vary depending on a variety of parameters previously discussed. Furthermore, the manner in which the counterweight 880 moves may vary across different embodiments of the invention.

One skilled in the art will recognize that a solar table may have a variety of different support structures such as beams, purlins, etc., that either supplement or replace a torque tube. All of these different solar type examples are intended to fall within the scope of certain embodiments of the invention and the different ways in which the solar table is coupled to the mobile transport is intended to fall within the scope of certain embodiments of the invention.

One skilled in the art will recognize that the different movements supported by the mobile transport support robust alignment processes that allow for a more efficient and accurate alignment of a solar table to a corresponding mounting structure. In some embodiments, the alignment process(es) may be performed manually by personnel at the installation site that control each of the motors during alignment. In other embodiments, the alignment process(es) may be automatically performed by sensors and motor controls such that motor movement is controlled by computerized analysis of sensor data and/or image data. A variety of sensor technologies may be employed by a mobile transport such as LiDAR, camera sensors, radar sensors and other sensor technologies known to one of skill in the art. Furthermore, active and passive sensor systems may also be deployed.

In certain examples, detachable sensor systems may be positioned on a solar table (such as on a torque tube) prior to or during installation of the solar table. The detachable sensor device/system may be removed from the solar table once installation is complete and positioned on another table that needs to be installed within the system.

In other examples, the alignment process may comprise both manual and automated processes that result in the installation of a solar panel within the system.

The mobile transport may also include verification devices that confirm a solar table has been properly installed. These verification devices may include sensors that measure movement under a test force of the solar table to determine whether a swaged end is tightly inserted within a corresponding mounting structure.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A solar table mobile transport (hereinafter, "mobile transport") for moving a solar table, the mobile transport comprising:

a transport component having a vehicular segment and a driving system, the transport component being operable to move the solar table from a first location to a point of installation under control of the driving system; and a first solar table alignment and support component coupled to the transport component, the first solar table alignment and support component provides horizontal and vertical motion of the solar table, the solar table alignment and support component comprising:

at least one first solar table securing clamp that couples to the solar table;

a first sideshift element comprising a rail on which the torque tube moves horizontally during an alignment process, the rail is positioned proximate to a top end of the solar table alignment and support component;

a second solar table alignment and support component coupled to the transport component, the second solar table alignment and support component provides horizontal and vertical motion of the solar table, the second solar table alignment and support component comprising:

at least one second solar table securing clamp that couples to the solar table; and a second sideshift element that provides horizontal motion of the solar table during the alignment process; and wherein the first and second sideshift elements provide horizontal movement of a torque tube on the solar table beyond a side edge of the transport component.

2. The mobile transport of claim 1 further comprising at least one stabilizer leg that stabilizes the mobile transport during horizontal motion of the solar table.

3. The mobile transport of claim 1 further comprising at least one counterweight that stabilizes the mobile transport during horizontal motion of the solar table.

4. The mobile transport of claim 1 wherein the driving system allows manual driving of the mobile transport to the point of installation.

5. The mobile transport of claim 1 wherein the driving system allows the mobile transport to be remotely driven to the point of installation.

6. The mobile transport of claim 1 wherein the first and second at least one solar table securing clamp comprises at least one end effector.

7. A solar table alignment and support component that couples to a solar table mobile transport, the solar table alignment and support component comprising:

at least one solar table securing clamp that couples to a solar table;

a sideshift element comprising a rail having a track that provides horizontal motion of the solar table, the horizontal motion extending beyond an edge of a transport component of the solar table mobile transport, the rail is positioned proximate to a top portion of the solar table alignment and support component; and wherein the solar table alignment and support component provides vertical motion of the solar table during the alignment process.

8. The solar table alignment and support component of claim 7 wherein the solar table alignment and support component is controlled autonomously during the alignment process.

9. The solar table alignment and support component of claim 7 wherein the solar table alignment and support component is controlled manually during the alignment process.

10. The solar table alignment and support component of claim 7 wherein at least one solar table securing clamp comprises at least one end effector.

11. The solar table alignment and support component of claim 7 wherein a compensation element is used during horizontal movement of the solar table.

* * * * *